United States Patent
Le Peltier et al.

(10) Patent No.: US 6,605,566 B2
(45) Date of Patent: Aug. 12, 2003

(54) SUPPORTED BIMETALLIC CATALYST WITH A STRONG INTERACTION BETWEEN A GROUP VIII METAL AND TIN, AND ITS USE IN A CATALYTIC REFORMING PROCESS

(75) Inventors: Fabienne Le Peltier, Rueil-Malmaison (FR); Blaise Didillon, Francheville (FR); Jean-Claude Jumas, Jacou (FR); Josette Olivier-Fourcade, Jacou (FR)

(73) Assignee: Institut Francais du Petrole, Cedex (FR)

( * ) Notice: Subject to any disclaimer, the term of this patent is extended or adjusted under 35 U.S.C. 154(b) by 0 days.

(21) Appl. No.: 09/934,656

(22) Filed: Aug. 23, 2001

(65) Prior Publication Data

US 2002/0045544 A1 Apr. 18, 2002

(30) Foreign Application Priority Data

Aug. 23, 2000 (FR) .............................. 00 10878

(51) Int. Cl.[7] .......................... B01J 23/00; B01J 23/58; C07C 13/00; C07C 2/52; C10G 35/00
(52) U.S. Cl. ....................... 502/325; 502/327; 502/330; 502/332; 502/349; 502/230; 585/350; 585/419; 585/458; 585/462; 585/489; 585/660; 585/747; 208/133
(58) Field of Search ................ 502/325, 349, 502/327, 330, 332, 230; 575/350, 419, 458, 462, 489, 660, 747; 208/133

(56) References Cited

U.S. PATENT DOCUMENTS 3,691,102 A * 9/1972 Swift .......................... 252/469
3,998,900 A * 12/1976 Wilhelm .................. 260/668 D
4,020,012 A 4/1977 Miura et al. ................. 252/441
4,070,272 A * 1/1978 Rausch ........................ 208/217
5,128,300 A * 7/1992 Chao et al. .................. 502/227
5,665,223 A * 9/1997 Bogdan ........................ 208/138
5,858,908 A * 1/1999 Bogdan et al. ............. 502/227

FOREIGN PATENT DOCUMENTS

EP 0 913 198 A1 5/1999

OTHER PUBLICATIONS

XP 000551908—Characterization of Pt–Sn/SiO$_2$ catalysts and the role of Sn in NO–hydrocarbon reactions; Tomoya Inoue et al., pp. 461–467—J. Chem. Soc. Faraday Trans. 1996. Month not avail.

* cited by examiner

Primary Examiner—Mark L. Bell
Assistant Examiner—Patricia L. Hailey
(74) Attorney, Agent, or Firm—Millen, White, Zelano, Branigan, P.C.

(57) ABSTRACT

A novel supported bimetallic catalyst comprises a group VIII metal such as platinum, and tin, at least a portion of which interacts strongly with the group VIII metal in the catalyst in the reduced state. In the partially oxidized state, the catalyst of the invention contains at least 10% of tin in the form of a reduced tin species with oxidation state 0, said species having an isomer shift in the range 0.80 to 2.60 mm/s and a quadrupolar splitting in the range 0.65 to 2.00 mm/s. The invention also concerns the preparation of said catalyst, and processes using said catalyst for transforming hydrocarbons into aromatic compounds, such as gasoline reforming processes and aromatic production processes.

40 Claims, No Drawings

SUPPORTED BIMETALLIC CATALYST WITH A STRONG INTERACTION BETWEEN A GROUP VIII METAL AND TIN, AND ITS USE IN A CATALYTIC REFORMING PROCESS

FIELD OF THE INVENTION

The present invention relates to a novel supported catalyst comprising at least one group VIII metal and at least one additional metal constituted by tin, at least a portion of which interacts strongly with said group VIII metal. The invention also relates to the use of said catalyst in the principal hydrocarbon transformation processes using petroleum refining, in particular in catalytic reforming processes.

PRIOR ART

A large number of patents and publications demonstrate that the addition of promoters to a base metal improves the performances of catalysts. Such elements are added in different forms, such as salts or organometallic compounds. In general, more active or more selective catalysts are obtained that are sometimes more stable than the corresponding monometallic catalyst.

The formulation of catalysts used in hydrocarbon transformation processes, in particular catalysts for catalytic reforming and paraffin dehydrogenation, has been the subject of a large number of studies. Of the more frequently used promoters, tin, can increase the selectivity and stability of the catalysts. Catalysts based on PtSn supported on alumina and used in that type of application have, for example, been described in French patent FR-B-2 031 984 and U.S. Pat. No. 3,531,543.

Catalytic reforming catalysts are bifunctional as they combine two functions essential to optimum performance: a hydrodehydrogenating function, which ensures dehydrogenation of naphthenes and hydrogenation of coke precursors, and an acid function that isomerises naphthenes and paraffins, and cyclises long chain paraffins. The hydrodehydrogenation function is generally provided by platinum, which has a hydrogenolysing activity to the detriment of the gasoline and/or aromatic compounds yields desired for catalytic reforming, or in the aromatic compound production process. This hydrogenolysing activity can be substantially reduced by adding tin and the selectivity of the catalyst is thus substantially increased. Further, adding tin can also increase the hydrogenating properties of platinum, which encourages hydrogenation of coke precursors, and thus the stability of the catalyst. Such bimetallic catalysts perform better in terms of activity and/or selectivity than catalysts containing the catalytically active principle alone (palladium, platinum or nickel). The metals in the catalyst are added in different forms, such as mineral salts or organometallic compounds. The manner in which such modifying agents are introduced is important as it has a profound effect on the catalyst's properties.

In particular, catalysts based on PtSn contain different forms of tin. In the reduced state, these catalysts, supported on alumina, essentially contain species of tin in the oxidised state, namely species of divalent tin $Sn^{II}$ and tetravalent tin $Sn^{IV}$, and minor quantities of tin in the reduced state $Sn^0$ (M. C. Hobson et al., J. Catal., 142, 641–654 (1993), L. D. Sharma et al., Appl. Catal. A Genneral., 168, 251–259, (1998)). These catalysts are generally prepared from a solution of tin chloride in an acidic medium (HCl, $NHO_3$) and a hexachloroplatinic acid solution.

One technique that can examine the local electronic structure of the tin (oxidation state, environment, chemical bonding) is Mössbauer spectroscopy, which directly provides two fundamental parameters: the isomer shift, δ (IS) and the quadrupolar splitting Δ (QS). The isomer shift δ measures the energy position of the Mössbauer absorption, a function of the density of the nucleus s, directly characterises the oxidation state of the tin. The quadrupolar splitting, A, which defines the form of the absorption, is a function of the distribution of the surrounding charges, and characterizes the degree of coordination and thus the type of chemical bond in which the tin is involved. Each species of tin is characterized by a sub-spectrum defined by the two parameters IS and QS Mössbauer spectroscopy also provides access to the line width LW, by comparison with the natural width of the emission (0.64 mm/s): the line width LW provides information regarding the degree of order and the distribution of the sites occupied by the tin. The relative intensity of the absorption for each species is proportional to the number of tin atoms and to the Mössbauer Lamb factor f, which represents the probability of resonant absorption without recoil and without thermal broadening. The factor f is directly related to the rigidity of the lattice and its value is increased by a reduction in the temperature of measurement. It can be small at ambient temperature (0.06 for the metallic β phase of tin) and thus requires measurements to be carried out at low temperatures. The proportion of each species is estimated from their contribution to the total absorption, provided that the recoil-free resonant absorption fractions f are not too different.

Characterisations using Mössbauer spectroscopy of reduced catalysts based on PtSn supported on alumina or silica mention the existence of a species $Sn^0$ contained in a $Pt_xSn_y$ type phase (x and y from 1 to 4) in which the tin is in oxidation state 0 (IS of 1.4 to 1.8 mm/s with respect to $BaSnO_3$) in a form that is very close to bulk alloys characterized by a low or zero quadrupolar splitting (M. C. Hobson et al., J. Catal., 142, 641–654 (1993); Z. Huang et al., J. Catal., 159, 340–352 (1993); J. L. Margitfalvi et al., J. Catal., 190, 474–477 (2000); V. I. Kuznetov et al., J. Catal., 99, 159 (1986); R. Bacaud et al., J. Catal., 69, 399 (1981); R. Srinivasan et al., Catal. Today, 21, 83 (1994)). On alumina, the formation of metallic tin in the reduced state, favoured with larger metallic particle sizes of more than 2 nm, is responsible for the loss in performance of PtSn catalysts supported on alumina (Z. Huang et al., J. Catal., 159, 340–352, (1993), F. Yining et al., Stud. Surf. Sci. Catal., 68, 683–690, (1991)). A number of documents describe the use of catalysts containing a PtSn phase dispersed on alumina or tin that is essentially in a higher oxidation state than that of metallic tin (U.S. Pat. No. 3,846,283, U.S. Pat. No. 3,847,794). Under such conditions, the conventional preparation methods used cannot guarantee a close association between tin and platinum, an intimate association between those metals in the catalyst in the reduced state being generally desirable, however, to best exploit the bimetallic effect.

SUMMARY OF THE INVENTION

The invention is based on the discovery of a novel catalyst containing at least one metal from group VIII of the periodic table and at least tin at least a portion of which interacts strongly with the group VIII metal. The supported catalyst of the invention is characterized in that it contains metallic particles, of small size, less than 2 nm, and in that at least 10% of the tin species present in the catalyst in the partially re-oxidised state are in the form of a reduced tin species with oxidation state 0. Said reduced species is in a particular form, as demonstrated by $^{119}$Sn Mössbauer spectroscopy, and is characterized by a very high quadrupolar splitting value of more than 0.65 mm/s and an isomer shift IS in the range 0.8 to 2.6 mm/s with respect to $BaSnO_3$. This species is revealed by carrying out perfectly controlled oxidation on the reduced catalyst by discontinuous injections of oxygen. This particular species of tin is very closely associated with the group VIII metal and reveals a very strong interaction between the atoms of said group VIII metal and at least a fraction of the tin in the catalyst in the reduced state. As an example, in the case where the group VIII metal is platinum, a $Pt_xSn_y$ phase is formed in which the tin has set values for IS and QS. The invention also concerns the preparation of said catalyst and its use in hydrocarbon transformation processes, in particular in catalytic reforming processes.

IMPORTANCE OF THE INVENTION

The catalyst of the invention has substantially improved catalytic properties with respect to prior art catalysts, in particular as regards activity and stability. It has surprisingly been discovered that the presence of a large quantity of a reduced tin species with oxidation state 0 and closely associated with a group VIII metal in a bimetallic catalyst that is partially oxidised by oxidation carried out under perfectly controlled conditions with discontinuous injection of oxygen, reveals a strong interaction in the reduced state of the catalyst between the group VIII metal and at least a fraction of the tin, guaranteeing a beneficial bimetallic effect on the catalytic performances of the hydrocarbon transformation units, such as catalytic reforming units, in terms of activity and stability, better activity and better stability very substantially increasing the aromatics yield, the target products of catalytic reforming. In the case of reforming, the catalyst of the invention results in a better quality of the reformate with a higher research octane number and deactivates more slowly than known catalysts.

DESCRIPTION

The catalyst of the invention comprises at least one support, at least one metal from group VIII of the periodic table and at least tin, at least a portion of which interacts strongly with the group VIII metal in the catalyst in the reduced state. In the remainder of the description, a distinction is made between the catalyst in the reduced state and the partially oxidised catalyst in that the quantity of tin reduced to oxidation state 0 and in intimate association with a group VIII metal is higher in the partially oxidised catalyst.

The support comprises at least one refractory oxide that is generally selected from oxides of metals from groups IIA, IIIA, IIIB, IVA or IVB of the periodic table, such as oxides of magnesium, aluminium, silicon, niobium, titanium, zirconium and thorium, taken alone or as a mixture or mixed with oxides of other elements from the periodic table, For hydrocarbon transformation reactions, in particular for catalytic reforming reactions, the preferred support is alumina, with a specific surface area advantageously in the range 5 to 400 m² per gram, preferably in the range 50 to 350 m²/g. The support for the catalyst of the invention can also be a zeolite or molecular sieve of type X, Y, mordenite, faujasite, ZSM-5, ZSM-4, ZSM-8, MFI, EUO, mazzite and mixtures of oxides of metals from groups IIA, IIIA, IIIB, IVA and IVB with the zeolitic material, in particular aluminium oxide-zeolite mixtures.

The group VIII metal is the catalytically active base metal of the catalyst of the invention. Preferably, it is a noble metal from the platinum family (Pt, Pd, Rh, Ir). More preferably, the noble metal is platinum. Advantageously, the catalyst contains a first noble metal (such as Pt) to which iridium is added. For paraffin hydroreforming and dehydrogenation, platinum and iridium are preferred. The percentage by weight is selected so as to be in the range 0.01% to 10%, preferably in the range 0.05% to 5%.

The tin acts as a promoter. The percentage by weight of tin in the catalyst in the reduced state, including all species (reduced and oxidised) with respect to the total catalyst weight, is in the range 0.01% to 2%, for example. Very advantageously, the catalyst of the invention contains at least 0.1% by weight of tin. In accordance with the invention, tin is present in the reduced catalyst essentially in the oxidised state ($Sn^{II}$ and $Sn^{IV}$). An essential feature of the invention is the high proportion of metallic tin $Sn^0$ with respect to the oxidised tin species, when the catalyst is in the partially oxidised state, i.e., when the reduced catalyst has undergone perfectly controlled oxidation by discontinuous injection of oxygen. This species of metallic tin $Sn^0$ is in the very particular form of an VIII metal-Sn alloy, in which said group VIII metal and tin are intimately associated and strongly interact with oxygen. This species has very high QS values in the range 0.65 to 2.00 mm/s and is revealed when the catalyst is partially oxidised. The catalyst of the invention is characterized in that in the partially oxidised state, at least 10% of the tin with respect to the tin introduced is in the form of a reduced species with an oxidation state of 0, i.e., this reduced species with oxidation state 0 represents at least 10% of the tin present in the catalytic mass. Advantageously, said reduced tin species with oxidation state 0 represents at least 12% of the tin present in the catalytic mass. Preferably, it represents at least 15%, more preferably at least 20% and still more preferably at least 25%. Highly preferably, it represents at least 30%.

In the partially oxidised state of the catalyst, said reduced tin species generally does not represent more than 90% of the catalytic mass. Preferably, it does not represent more than 70% and more preferably, it does not represent more than 60%.

The term "catalyst in the partially oxidised state" means a catalyst that has been oxidised in a perfectly controlled manner by discontinuous injections of oxygen. In accordance with the invention, perfectly controlled oxidation of the catalyst in the reduced state can reveal, by Mössbauer spectroscopy, the presence of a large quantity of metallic tin in intimate association with the group VIII metal, in particular platinum, and oxygen, the presence of said reduced tin species resulting in the existence of a strong interaction between said group VIII metal, preferably platinum, and at least a fraction of the tin in the catalyst in the reduced state. The catalyst of the invention in its partially oxidised state contains $Sn^{2+}$ species and said tin species reduced to oxidation state 0 ($Sn^0$) is in the particular form of an VIII metal-Sn alloy, preferably in the particular form of a Pt-Sn alloy.

When the reduced catalyst is oxidised under non controlled conditions such as re-oxidation in air with a high partial pressure of oxygen, the amount of the metallic tin species $Sn^0$ in the form of VIII metal-Sn alloy, preferably in the form of a PtSn alloy, reduces very substantially to the advantage of the formation of $Sn^{4+}$ species. The catalyst is then strongly oxidised and essentially comprises $Sn^{4+}$ species. It no longer contains $Sn^{2+}$ species. This formation of $Sn^{4+}$ species perturbs the quantification of Sn species strongly interacting with the group VIII metal, preferably platinum, present from the reduced state, and thus the performance of the catalyst in its reduced state cannot be appreciated. In contrast, controlled oxidation by discontinuous injection of oxygen can selectively form said reduced tin species $Sn^0$ with the Mössbauer characteristics described above, avoiding the formation of $Sn^{4+}$ species.

Depending on the field of application, the catalyst can also optionally contain, for example, at least one halogen or a halogenated compound in proportions of the order of 0.1 to 3% by weight of catalyst. It can also contain at least one alkali metal or an alkaline-earth metal in proportions of the order of 0.1% to 3% by weight of catalyst. It can also optionally contain at least one metalloid such as sulphur in proportions of the order of 0.01% to 2% by weight of catalyst. It can also contain at least one other chemical element, for example rhenium or niobium, in proportions of the order of 0.01% to 3% by weight of catalyst, said element being introduced into the catalyst using any method and in any form that is known to the skilled person.

The catalyst can be in the form of beads, extrudates, trilobes or any other routinely used form. The catalyst of the invention contains metallic particles with small sizes, i.e., less than 2 nm. For particular applications, in particular catalytic reforming, it is advantageous to use a catalyst with metallic particles with a size of less than 1.2 nm. Highly advantageously, the size of said particles does not exceed 1 nm.

Analyses that can examine the local electronic structure of the tin are carried out in a conventional Mössbauer spectroscopy provided with a $Ba^{119m}SnO_3$ γ radiation source with a nominal activity of 10 mCi. The spectrometer operates in transmission mode with a velocity transducer with a constant acceleration functioning in triangular mode with respect to a 512-channel multichannel analyser, controlled by a microcomputer. The detector is a 0.1 mm thick NaI (Tl) crystal scintillator. The scale is calibrated using a standard 6-line α-Fe spectrum obtained with a $^{57}Co(Rh)$ source. All of the isomer shifts IS are given with respect to a $BaSnO_3$ standard. ISO software is used to resolve the experimental spectra into Lorentzian profiles and into the different parameters, plus the mean squares (W. Künding, Nucl. Instrum. Method., 75, 336 (1969)).

For certain analyses carried out at low temperature, a cryostat with a variable flow and temperature (4 to 300 K) is advantageous. Such measurements are necessary to characterize values of factor relating to a given species.

The analyses are carried out using powdered catalysts, already reduced, in a hydrogen flow, between 450° C. and 550° C. After cooling to ambient temperature in hydrogen and flushing with a neutral gas such as helium, the reduced catalyst undergoes the number of pulses of oxygen necessary to saturate it. Pulsed injections are continued until at least 10 peaks are obtained with a constant surface area (chromatographic analysis), then the catalyst is flushed with a neutral gas such as helium, the treatment cell is sealed directly without ingress of air. The quantity of catalyst necessary, including the amount of tin, is at least 2 g. This cell can be used at ambient temperature or at low temperatures. The catalyst tested using Mössbauer spectroscopy is in the partially re-oxidised state.

The partially oxidised catalyst, analysed by Mössbauer spectroscopy, contains tin in the oxidised form (divalent or tetravalent tin) and in the reduced form. In accordance with the invention, the $Sn^{IV}$ species are characterized by an isomer shift IS in the range 0 to 0.25 mm/s and with a quadrupolar splitting QS in the range 0 to 0.80 mm/s. $Sn^{II}$ species are characterized by an IS in the range 2.70 to 3.40 mm/s and a QS in the range 1.60 to 2.60 mm/s. $Sn^0$ species are characterized by an IS in the range 0.80 to 2.60 mm/s and a QS in the range 0.65 to 2.00 mm/s.

In accordance with the invention, said reduced tin species in oxidation state 0 ($Sn^0$) is a particular form of the VIII metal-Sn alloy, preferably in the particular form of a Pt-Sn alloy, with values of IS in the range 0.80 to 2.60 mm/s, preferably in the range 0.80 to 1.50 mm/s, more preferably in the range 1.10 to 1.40 mm/s and with values of QS in the range 0.65 to 2.00 mm/s, preferably in the range 0.80 to 2.00 mm/s, more preferably in the range 0.90 to 1.90 mm/s and still more preferably in the range 0.95 to 1.50 mm/s. Advantageously, said reduced tin species in oxidation state 0 ($Sn^0$), in the particular form of a VIII metal-Sn alloy, and in particular in the form of a PtSn alloy, and with values of IS and QS as given above, is only present in the catalyst in the partially oxidised state.

The values for the Mössbauer parameters obtained for the catalyst of the invention in the partially oxidised state, are the results of the existence, from the reduced state, of a strong interaction between at least a fraction of the tin and the group VIII metal, this interaction being revealed by perfectly controlled oxidation of the reduced catalyst.

The very close association of these two metals in the catalyst of the invention can exploit to the limit the intrinsic properties of each metal and thus generates a synergistic effect that is even greater when the reduced tin species with oxidation state 0 is in a large quantity and has a high QS. As an example, when the group VIII metal is platinum, the reduced tin species is contained in a particular phase of the type $Pt_xSn_y$ where said reduced tin species and the platinum are in intimate association.

The tin precursor can be selected from the group formed by halogenated compounds, hydroxides, oxides, carbonates, carboxylates, nitrates and sulphates of tin, this list being non-limiting. It can be introduced in the form of at least one organic compound selected from the group formed by tin complexes, and hydrocarbyl tin compounds such as tin alkyls, cycloalkyls, aryls, alkylaryls and arylalkyls. The tin precursor can also be selected from the group formed by halogenated compounds, hydroxides, oxides, carbonates, carboxylates, nitrates and sulphates of organometallic tin compounds, this list being non-limiting. These compounds comprise at least one carbon-Sn bond. As an example, the tin precursor can be selected from polyalkyl halides, for example trimethyl halides ($Me_3SnX$), triethyl halides ($Et_3SnX$), dimethyl dihalides ($Me_2SnX_2$), diethyl dihalides ($Et_2SnX_2$), diisopropyl dihalides ($iPr_2SnX_2$), di-n-propyl dihalides ($n-Pr_2SnX_2$), methyl trihalides ($MeSnX_3$), ethyl trihalides ($EtSnX_3$), isopropyl trihalides ($i-PrSnX_3$), di-n-propyl trihalides ($n-PrSnX_3$), polyalkyl hydroxides, for example trimethyl hydroxides ($Me_3SnOH$), triethyl hydroxides ($Et_3SnOH$), dimethyl dihydroxides ($Me_2Sn(OH)_2$), diethyl dihydroxides ($Et_2Sn(OH)_2$), diisopropyl dihydroxides ($iPr_2Sn(OH)_2$), n-propyl dihydroxides ($n-Pr_2Sn(OH)_2$), methyl trihydroxides ($MeSn(OH)_3$), ethyl trihydroxides ($EtSn(OH)_3$), diisopropyl trihydroxides ($iPrSn(OH)_3$), n-propyl trihydroxides ($n-PrSn(OH)_3$), polyalkyl acetates, for example trimethyl acetate ($Me_3SnOC(O)Me$), triethyl acetate ($Et_3SnOC(O)Me$), tributyl acetate ($Bu_3SnOC(O)Me$), polyalkyl oxides, for example bis-trimethyl oxide ($[Me_3Sn]_2O$), bis-triethyl oxide ($[Et_3Sn]_2O$), bis-tripropyl oxide ($[Pr_3Sn]_2O$), bis-tributyl oxide ($[Bu_3Sn]_2O$), polyalkyl sulphates, for example bis-trimethyl sulphate ($[Me_3Sn]_2SO_4$), bis-dimethyl sulphate ($[Me_2Sn]_2SO_4$), methyl trioxo sulphate ($MeSnO_3$), where X represents a halogen selected from the group formed by fluorine, chlorine, bromine and iodine. The tin precursor can be selected from compounds with general formula $(R1)_xM(R2)_y(R3)_z$, where $x+y+z=$ the valency of tin and where R1 is selected from the group formed by alkyl, cycloalkyl, nitrile (CN), carbonyl (CO), aryl, alkylaryl and arylalkyl radicals, where R2 is a function with the form $C_aH_bR'c$, where R' represents a hydroxide, halide, carboxylate, $PO_3H$ or $SO_3H$ function and where R3 is an aquo, oxo (MO), alkoxide (O-alkyl), hydride, hydroxyl, alkylsulphonate, alkylsulphate, thioalkyl, $N(SO_3R")_2$, $PR"_2$ and $PR"_3$ group, where R" is an alkyl group ("Handbook of physics and chemistry", $63^{rd}$ edition, 1982–83). The terms "alkyl groups" means groups comprising linear, branched or cyclic saturated carbon atoms and hydrogen atoms. The term "aryl groups" means aromatic groups. At least one alkyl group in the compounds cited above can be replaced by an alkenyl group, i.e., a group comprising linear, branched or cyclic unsaturated carbon atoms and hydrogen, for example an allyl group.

Preferred tin precursors are organometallic compounds of the type $SnR_4$ (R=alkyl group) or polyalkyl halides such as $Me_3SnCl$, $Me_2SnCl_2$, $MeSnCl_3$, $Et_3SnCl$, $Et_2SnCl_2$, $EtSnCl_3$, $iPrSnCl_2$ and the hydroxides $Me_3SnOH$, $Me_2Sn(OH)_2$, $Et_3SnOH$, $Et_2Sn(OH)_2$, the oxide $[Bu_3Sn]_2O$, or the acetate $Bu_3SnOC(O)Me$. These polyalkyl halides comprise at least one carbon-Sn bond and at least one hydrosoluble function, which renders them soluble in aqueous solvents, facilitating processing when preparing the catalyst.

The group VIII metal compound can be introduced in the form of an inorganic or organic complex selected, for example, when the group VIII metal is platinum, from hexachloroplatinic acid, hexahydroxyplatinic acid, dihydroxytetramine platinum, platinum diaminonitrite, or from organometallic complexes such as platinum bis-acetylacetonate.

Preparation of the catalyst of the present invention includes simultaneous or successive introduction in any order of the group VIII metal, tin, optional halogen or halogenated compound, optional alkali or alkaline-earth metal, optional metalloid, and optional other chemical element. When the elements are introduced successively, once the first element has been introduced, the skilled person will then be able to adapt the conditions for introducing the other elements so as to obtain a catalyst with the characteristics defined above.

The metals can be introduced during any of the catalyst manufacturing steps using prior art techniques. As an example, the tin can be added to an alumina sol (U.S. Pat. No. 3,929,683) or when the support is being formed, for example using extrusion forming (U.S. Pat. No. 3,917,808) or by the oil drop method (U.S. Pat. No. 3,558,508). In a preferred implementation of the preparation process of the invention, the catalyst is obtained by impregnating the support, which has been moistened, using an aqueous solution saturated with $CO_2$, containing at least one tin precursor in the form of $SnCl_2$ or, preferably, in the form of organometallic compounds containing at least one carbon-tin bond such as polyalkyl halides, for example $Me_3SnCl$, $Me_2SnCl_2$, $MeSnCl_3$, $Et_3SnCl$, $Et_2SnCl_2$, $EtSnCl_3$, $iPrSnCl_2$ and the hydroxides $Me_3SnOH$, $Me_2Sn(OH)_2$, $Et_3SnOH$, $Et_2Sn(OH)_2$, the oxide $[Bu_3Sn]_2O$, or the acetate $Bu_3SnOC(O)Me$. After leaving the solid and impregnating solution in contact for several hours, the product is filtered then optionally undergoes a drying step at 120° C. and an optional calcining step between 300° C. and 600° C., preferably between 450° C. and 550° C. The solid obtained is preferably impregnated with an organic solution of at least one compound of a group VIII metal, the volume of the solution being in excess with respect to the retention volume of the support. After several hours contact, the product obtained is dried and calcined in air between 300° C. and 600° C., preferably in a stream of air for several hours.

In a further, preferred, implementation of the preparation process of the invention, the catalytically active base metal such as platinum is deposited in a plurality of steps before depositing the tin, to selectively deposit the tin on particles with a controlled size, i.e., on particles with a size that is larger than that of the final catalyst. As an example, the support is impregnated with an organic solution containing at least one organometallic platinum compound such as platinum acetylacetonate ($Pt(acac)_2$), the volume of the solution preferably being in excess with respect to the retention volume of the support. After leaving the solid and impregnating solution in contact for several hours, the product is filtered then dried and calcined in air between 300° C. and 600° C., preferably between 400° C. and 500° C., advantageously flushing with air for several hours. It is then reduced in a stream of hydrogen between 300° C. and 600° C., preferably between 350° C. and 500° C. The catalyst is then transferred to the impregnation reactor without ingress of air, to deposit platinum again following exactly the same procedure as that given above. This can be carried out a number of times. To deposit the tin, the solid obtained is transferred to a reactor without ingress of air where tin impregnation is carried out by bringing an aqueous or organic solution of an organometallic tin compound into contact for several hours, the volume of the solution preferably being in excess with respect to the retention volume of the support. The reaction is advantageously carried out in a stream of hydrogen into the impregnating solution. The solid obtained is filtered, dried and reduced in a stream of hydrogen between 300° C. and 600° C.

Regardless of the process for preparing the catalyst of the invention, prior to use, the catalyst advantageously undergoes an oxychlorination treatment, in a stream of a gas comprising oxygen, chlorine and possibly water using any technique that is known to the skilled person (U.S. Pat. No. 3,875,049).

Before use, the catalyst is reduced in hydrogen, for example between 200° C. and 600° C., to obtain an active metallic phase. The procedure for this treatment consists, for example, in slowly raising the temperature in a stream of hydrogen to the maximum reduction temperature, for example in the range 200° C. to 600° C., preferably in the range 250° C. to 550° C., more preferably in the range 350° C. to 550° C., followed by a constant temperature stage for 1 to 6 hours at that temperature.

This reduction can be carried out immediately after calcining or subsequently on site. It is also possible to directly reduce the dried product on site.

The invention is not limited to the implementations described above, and any other preparation method is suitable that results in a reduced catalyst with a strong interaction between at least a fraction of the tin and a group VIII metal and in the partially oxidised form containing at least 10% of the tin in the form of tin with an oxidation state of 0, where the reduced tin species $Sn^0$ has an isomer shift in the range 0.80 to 2.60 mm/s and a quadrupolar splitting in the range 0.65 to 2.00 mm/s.

When the catalyst of the present invention contains sulphur, the sulphur is introduced into the formed, calcined catalyst containing the metal or metals cited above, either in situ prior to the catalytic reaction, or ex situ. Optional sulphurisation is carried out after reduction. With in situ sulphurisation, if the catalyst has not already been reduced, reduction takes place before sulphurisation. With ex situ sulphurisation, reduction is carried out followed by sulphurisation. Sulphurisation is carried out in the presence of hydrogen using any sulphurisation agent that is well known to the skilled person, such as dimethyl sulphide or hydrogen sulphide. As an example, the catalyst is treated with a feed containing dimethyl sulphide in the presence of hydrogen, with a concentration such that the sulphur/metal atomic ratio is 1.5. The catalyst is then kept at about 400° C. for about 3 hours in the stream of hydrogen before injecting the feed.

The reduced catalyst prepared in accordance with the invention can be used in a process for transforming hydrocarbons, in particular in hydrogenation processes, in particular in processes for hydrogenating oxygen-containing compounds and in processes for selective hydrogenation of unsaturated compounds such as diolefins and acetylenic compounds.

In accordance with the invention, the catalyst described above is advantageously used in processes for reforming gasoline and for the production of aromatic compounds. Reforming processes can increase the octane number of gasoline fractions from distilling crude oil and/or from other refining processes. Aromatic compound production processes provide bases (benzene, toluene and xylenes) for use in petrochemistry. These processes have a supplemental importance as they contribute to the production of large quantities of hydrogen that are vital to hydrogenation processes and to hydrotreatment processes carried out in the refinery. These two processes are distinguished by the choice of operating conditions and the composition of the feed.

The typical feed treated by these processes contains paraffinic hydrocarbons, naphthenic hydrocarbons and aromatics containing 5 to 12 carbon atoms per molecule. This feed is defined, inter alia, by its density and composition by weight. The feed is brought into contact with the catalyst of the present invention at a temperature in the range 400° C. to 700° C. The mass flow rate of the treated feed per unit mass of catalyst can be from 0.1 to 10 kg/kg/h. The operating pressure can be from atmospheric pressure to 4 MPa. A portion of the hydrogen produced is recycled using a molar recycle ratio in the range 0.1 to 10. This ratio is the molar ratio of the recycle hydrogen flow rate to the feed flow rate.

The following examples illustrate the invention without limiting its scope.

EXAMPLE 1

Not in Accordance with the Invention

A catalyst A was prepared comprising 0.55% of platinum, 0.45% of tin and 1% by weight of chlorine deposited on a gamma alumina support with a specific surface area of 200 $m^2/g$.

500 $cm^3$ of an aqueous solution containing tin chloride was added to 100 g of alumina support in the presence of hydrochloric acid and nitric acid. It was left in contact for 3 hours, filtered, dried at 120° C. then calcined for 2 hours at 500° C. in an air flow of 100 liters per hour. The solid was then brought into contact with 500 $cm^3$ of an aqueous solution of hexachloroplatinic acid and hydrochloric acid. It was left in contact for 3 hours then drained. It was dried for 1 hour at 120° C. then calcined for 2 hours at 500° C. in an air flow of 100 liters per hour.

Catalyst A was then reduced at 500° C. for 4 hours in a hydrogen flow of 100 liters per hour. Scanning electron microscope (SEM) analysis showed a very good dispersion of the metallic phase with particle sizes of less than 1.2 nm.

EXAMPLE 2

In Accordance with the Invention

A catalyst B was prepared with the same formulation as catalyst A.

Catalyst B was prepared by depositing platinum in two steps prior to depositing the tin. 100 g of alumina support was brought into contact with 500 $cm^3$ of an organic solution of platinum bis-acetylacetonate. It was left in contact for 12 hours then drained. It was dried for 1 hour at 120° C. then calcined for 2 hours at 350° C. in an air flow of 100 liters per hour. The catalyst was then reduced at 450° C. for 4 hours in a hydrogen flow rate of 100 liters per hour. After this reduction step, the solid was transferred without ingress of air into a reactor containing 500 $cm^3$ of an organic platinum bis acetylacetonate solution. It was left in contact for 12 hours then drained. It was dried for 1 hour at 120° C. then calcined for 2 hours at 350° C. in an air flow of 100 liters per hour. The catalyst was then reduced at 450° C. for 4 hours in a flow of hydrogen of 100 liters per hour. The solid obtained was transferred, without ingress of air, into a reactor containing 500 $cm^3$ of an organic solution containing the necessary quantity of tetrabutyltin to deposit 0.45% by weight on the catalyst, bubbling through hydrogen at 20° C. After 24 hours of contact, the reaction mixture was filtered, washed then dried at 70° C. The catalyst was then reduced for 4 hours at 450° C. in 100 liters per hour of hydrogen. The catalyst then underwent an oxychlorination treatment at 500° C. for 4 hours in an air flow of 100 liters per hour containing the quantity of chlorine necessary to deposit 1% by weight of chlorine and a quantity of water corresponding to a $H_2O/Cl$ mole ratio of 20.

Catalyst B was then reduced at 500° C. for 4 hours in a hydrogen flow of 100 liters per hour. Scanning electron microscope (SEM) analysis showed a very good dispersion of the metallic phase with particle sizes of less than 1.2 nm.

EXAMPLE 3

In Accordance with the Invention

A catalyst C was prepared comprising 0.66% by weight of platinum, 0.58% by weight of tin and 1% by weight of chlorine deposited on a gamma alumina support with a specific surface area of 200 $m^2/g$. 60 $cm^3$ of a solution of heptane containing tetrabutyl tin was added to 100 g of alumina support. It was left in contact for 6 hours, dried at 120° C., then calcined for 2 hours at 350° C. in an air flow of 100 liters per hour. 100 g of alumina support was then brought into contact with 500 $Cm^3$ of an organic platinum bis acetyl acetonate solution. It was left in contact for 12 hours then drained. It was dried for 1 hour at 120° C. then calcined for 2 hours at 350° C. in an air flow of 100 liters per hour. The catalyst then underwent an oxychlorination treatment at 500° C. for 4 hours in an air flow Of 100 liters per hour containing the quantity of chlorine necessary to deposit 1% by weight of chlorine and a quantity of water corresponding to a $H_2O/Cl$ mole ratio of 20. The catalyst was then reduced at 500° C. for 4 hours in a hydrogen flow of 100 liters per hour.

EXAMPLE 4

Characterization by Mössbauer Spectroscopy

For $^{119}Sn$ Mössbauer spectroscopic characterization, reduced catalysts A, B and C obtained as described above were treated using a χsorb apparatus to carry out dynamic oxygen chemisorption measurements in combination with on-line chromatographic analysis to furnish the oxygen consumption. The volume of the cell used was about 10 cm$^3$.

In each case, 2 grams of catalyst was activated at 500° C. for 4 hours in a flow of hydrogen. After cooling to ambient temperature, and flushing with helium, the number of pulses of oxygen necessary to saturate the catalyst was applied to the catalyst, i.e., until constant surface area peaks were obtained that corresponded to the total oxygen consumption. The volume of a pulse of pure oxygen was 0.22 cm$^3$. Pulse injection was continued until at least 10 peaks were obtained with a constant surface area, corresponding to the oxygen that had not reacted with the catalyst. Then after flushing in helium at ambient temperature, the treatment cell was directly sealed without ingress of air. The Mössbauer spectroscopic analyses were carried out with this cell, which was then cooled to the temperature of liquid nitrogen using the flow cryostat. The spectrum was then recorded in transmission mode using the apparatus described above. The data acquisition time was selected to produce the best signal/noise ratio. In the present examples, it was 48 hours.

The results, comprising identification, characteristics and amounts of different tin species present for catalysts A, B and C reduced then partially re-oxidised in a controlled manner by oxygen pulses are shown in Table 1.

TABLE 1

| Catalyst | Species attribution | IS (mm/s) | QS (mm/s) | LW (mm/s) | Proportion (%) |
|---|---|---|---|---|---|
| A | Sn$^{IV}$ | −0.02 (0.01) | 0.61 (0.02) | 0.83 (0.02) | 75.6 |
|   | Sn$^{II}$ | 3.38 (0.04) | 2.35 (0.06) | 0.83 (0.08) | 16.7 |
|   | Sn$^{0}$ | 1.32 (0.04) | 1.26 (0.02) | 0.91 (0.04) | 7.7 |
| B | Sn$^{IV}$ | 0.02 (0.01) | 0.58 (0.01) | 0.87 (0.01) | 61.6 |
|   | Sn$^{II}$ | 3.15 (0.02) | 1.10 (0.06) | 0.87 (0.01) | 2.9 |
|   | Sn$^{0}$ | 1.26 (0.02) | 1.24 (0.03) | 1.08 (0.04) | 35.5 |
| C | Sn$^{IV}$ | 0.09 (0.02) | 0.73 (0.02) | 0.90 (0.03) | 62.0 |
|   | Sn$^{II}$ | 3.00 (0.04) | 1.97 (0.04) | 0.90 (0.06) | 16.0 |
|   | Sn$^{0}$ | 0.80 (0.08) | 1.30 (0.08) | 0.90 (0.06) | 22.0 |

IS: isomer shift δ with respect to BaSnO$_3$
QS: quadrupolar splitting Δ
LW: mid-height peak width The values given in brackets are the standard deviations.

As can be seen, for the same formulation, catalyst B of the invention contains an amount of species Sn$^0$ contained in the phase Pt$_x$Sn$_y$ (QS of 1.24 mm/s) that is much higher than that determined for catalyst A that is not in accordance with the invention and which corresponds to prior art catalysts.

EXAMPLE 5

Catalysts A and B, in the reduced state, and as described above were tested by transforming a feed with the following characteristics:

| Density at 20° C | 0.753 kg/dm$^3$ |
|---|---|
| Research octane number | ~60 |
| Paraffin content | 49.4% by volume |
| Naphthene content | 35.1% by volume |
| Aromatics content | 15.5% by volume |

This transformation was carried out in the presence of hydrogen using the following operating conditions:

| Temperature | 500° C. |
|---|---|
| Total pressure | 0.3 MPa |
| Feed flow rate | 3.3 kg per kg of catalyst |
| Hydrogen/feed | 5 (molar) |

Before injecting the feed, the catalysts were activated at 500° C. in hydrogen for 4 hours. The performances obtained are shown in Table 2:

TABLE 2

| Catalyst | Duration (hours) | Research octane number | Reformate yield (wt %) | Aromatics yield (wt %) |
|---|---|---|---|---|
| A | 30 | 100.3 | 92.2 | 70.2 |
|   | 73 | 98.6 | 92.4 | 66.71 |
| B | 30 | 102.6 | 91.7 | 74.0 |
|   | 73 | 101.4 | 92.2 | 72.2 |

The research octane numbers and the aromatics yields produced by catalyst B are substantially higher than those for catalyst A.

What is claimed is:

1. A catalyst, in the reduced state, comprising at least one support, at least one metal from group VIII of the periodic table, at least tin which is essentially present in the oxidized state, wherein when said catalyst is in the partially oxidised state at least a portion of the tin is in the form of a reduced species with oxidation state 0, said reduced species having an isomer shift IS in the range 0.80 to 2.60 mm/s and with a quadrupolar splitting in the range 0.65 to 2.00 mm/s, and wherein when said catalyst is in the partially oxidised state, said reduced species with oxidation state 0 represents at least 10% of the tin present in the catalytic mass.

2. A catalyst according to claim 1, wherein when said catalyst is in the partially oxidised sate, said reduced tin species with oxidation state 0 represents at least 12% of the tin present.

3. A catalyst according to claim 1, wherein in the partially oxidised state, said reduced tin species with oxidation state 0 represents at least 15% of the tin present.

4. A catalyst according to claim 1, wherein in the partially oxidised state, said reduced tin species with oxidation state 0 represents at least 20% of the tin present.

5. A catalyst according to claim 1, wherein in the partially oxidised state, said reduced tin species with oxidation state 0 represents at least 25% of the tin present.

6. A catalyst according to claim 1, wherein in the partially oxidised state, said reduced tin species with oxidation state 0 represents at least 30% of the tin present.

7. A catalyst according to claim 1, wherein said reduced tin species with oxidation state 0 has an isomer shift in the range 0.80 to 1.50 mm/s.

8. A catalyst according to claim 1, wherein said reduced tin species with oxidation state 0 has a quadrupolar splitting in the range 0.80 to 2.00 mm/s.

9. A catalyst according to claim 1, wherein said reduced tin species with oxidation state 0 has a quadrupolar splitting in the range 0.90 to 1.90 mm/s.

10. A catalyst according to claim 1, wherein said reduced tin species with oxidation state 0 has a quadrupolar splitting in the range 0.95 to 1.50 mm/s.

11. A catalyst according to claim 1, wherein in the partially oxidised state, said catalyst contains Sn$^{2+}$ species.

12. A catalyst according to claim 1, further comprising at least one halogen or halogenated compound.

13. A catalyst according to claim 1, further comprising at least one alkali metal or alkaline-earth metal.

14. A catalyst according to claim 1, further comprising at least one metalloid.

15. A catalyst according to claim 1, wherein the group VIII metal is platinum.

16. A catalyst according to claim 1, wherein the support is alumina.

17. A catalyst according to claim 1, containing metallic particles less than 2 nm in size.

18. A process for preparing a catalyst according to claim 1, comprising depositing the group VIII metal in a plurality of steps prior to depositing the tin.

19. A process according to claim 18, comprising an oxychlorination treatment step.

20. A process according to claim 18, wherein said Group VIII metal is introduced in the form of an organic solution containing an organometallic complex.

21. A process according to claim 20, wherein said Group VIII metal is platinum.

22. A catalyst produced by the process according to claim 21.

23. A process according to claim 20, wherein said organometallic complex is platinum bis-acetylacetonate.

24. A process according to claim 23, wherein tin is introduced in the form of an organometallic compound selected from $SnR_4$ wherein R is an alkyl group, a polyalkyl halide, a polyalkyl hydroxide, $[Bu_3Sn]_2O$, or $Bu_3SnOC(O)Me$, wherein Bu is butyl and Me is methyl.

25. A process according to claim 24, wherein $SnR_4$ is tetrabutyl tin, said polyalkyl halide is $Me_3SnCl$, $Me_2SnCl_2$, $MeSnCl_3$, $Et_3SnCl$, $Et_2SnCl_2$, $EtSnCl_3$, or $iPrSnCl_2$, and said polyalkyl hydroxide is $Me_3SnOH$, $Me_2Sn(OH)_2$, $Et_3SnOH$, or $Et_2Sn(OH)_2$, wherein Me is methyl, Et is ethyl, and iPr is isopropyl.

26. A catalyst produced by the process according to claim 25.

27. A catalyst produced by the process according to claim 24.

28. A catalyst produced by the process according to claim 23.

29. A catalyst produced by the process according to claim 20.

30. A process according to claim 20, wherein tin is introduced in the form of an organometallic compound selected from $SnR_4$ wherein R is an alkyl group, a polyalkyl halide, a polyalkyl hydroxide, $[Bu_3Sn]_2O$, or $Bu_3SnOC(O)Me$, wherein Bu is butyl and Me is methyl.

31. A process according to claim 30, wherein $SnR_4$ is tetrabutyl tin, said polyalkyl halide is $Me_3SnCl$, $Me_2SnCl_2$, $MeSnCl_3$, $Et_3SnCl$, $Et_2SnCl_2$, $EtSnCl_3$, or $iPrSnCl_2$, and said polyalkyl hydroxide is $Me_3SnOH$, $Me_2Sn(OH)_2$, $Et_3SnOH$, or $Et_2Sn(OH)_2$, wherein Me is methyl, Et is ethyl, and iPr is isopropyl.

32. A catalyst produced by the process according to claim 31.

33. A catalyst produced by the process according to claim 30.

34. A process for transforming hydrocarbons comprising bringing a hydrocarbon feed into contact with a catalyst according to claim 1.

35. A process according to claim 34, in which the hydrocarbon transformation process is catalytic reforming.

36. A catalyst according to claim 1, wherein said catalyst in the reduced state contains 0.01–2 wt. % tin.

37. A catalyst according to claim 1, wherein said catalyst in the reduced state contains 0.1–2 wt. % tin.

38. A catalyst according to claim 1, wherein when said catalyst is in the partially oxidised state, said reduced tin species with oxidation state 0 represents not more than 90% of the tin present.

39. A catalyst according to claim 1, wherein when said catalyst is in the partially oxidised state, said reduced tin species is in the form of a Group VIII-Sn alloy.

40. A catalyst according to claim 1, wherein when said catalyst is in the partially oxidised state, said catalyst contains $Sn^{2+}$ and said reduced tin species with oxidation state 0.

* * * * *

UNITED STATES PATENT AND TRADEMARK OFFICE
CERTIFICATE OF CORRECTION

PATENT NO. : 6,605,566 B2
DATED : August 12, 2003
INVENTOR(S) : Fabienne Le Peltier et al.

It is certified that error appears in the above-identified patent and that said Letters Patent is hereby corrected as shown below:

<u>Column 12,</u>
Line 37, reads "oxidised sate," should read -- oxidised state, --

<u>Column 14,</u>
Line 3, reads "claim 20," should read -- claim 18, --

Signed and Sealed this

Twenty-second Day of June, 2004

JON W. DUDAS
*Acting Director of the United States Patent and Trademark Office*